Figure 1:
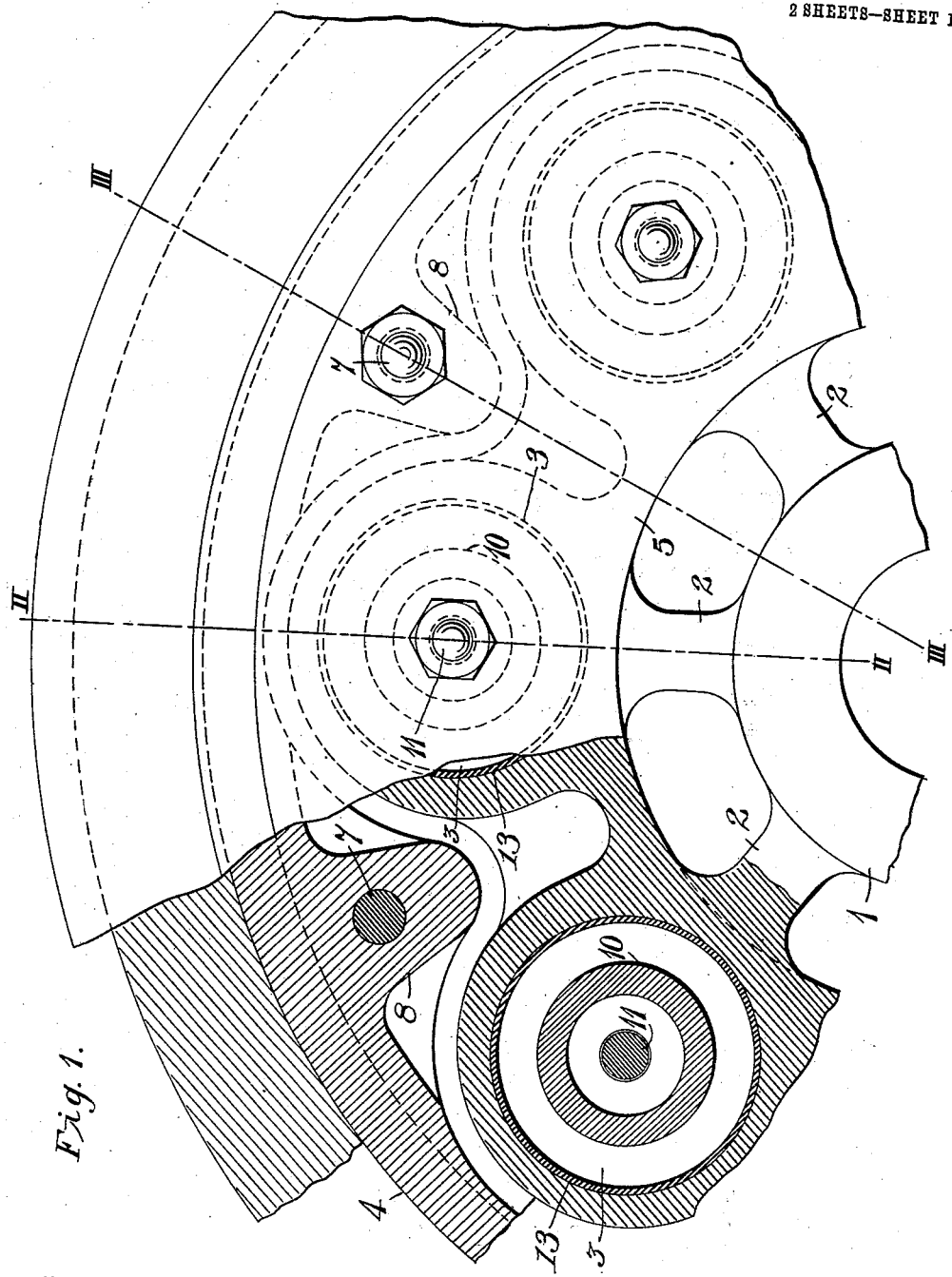

K. F. ELERS.
SPRING WHEEL.
APPLICATION FILED JUNE 8, 1908.

917,856.

Patented Apr. 13, 1909.

2 SHEETS—SHEET 1.

WITNESSES:
Fred H. Miller
R. J. Dearborn

INVENTOR
Karl F. Elers
BY
Wesley J. Carr
ATTORNEY

K. F. ELERS.
SPRING WHEEL.
APPLICATION FILED JUNE 8, 1908.
917,856.
Patented Apr. 13, 1909.
2 SHEETS—SHEET 2.
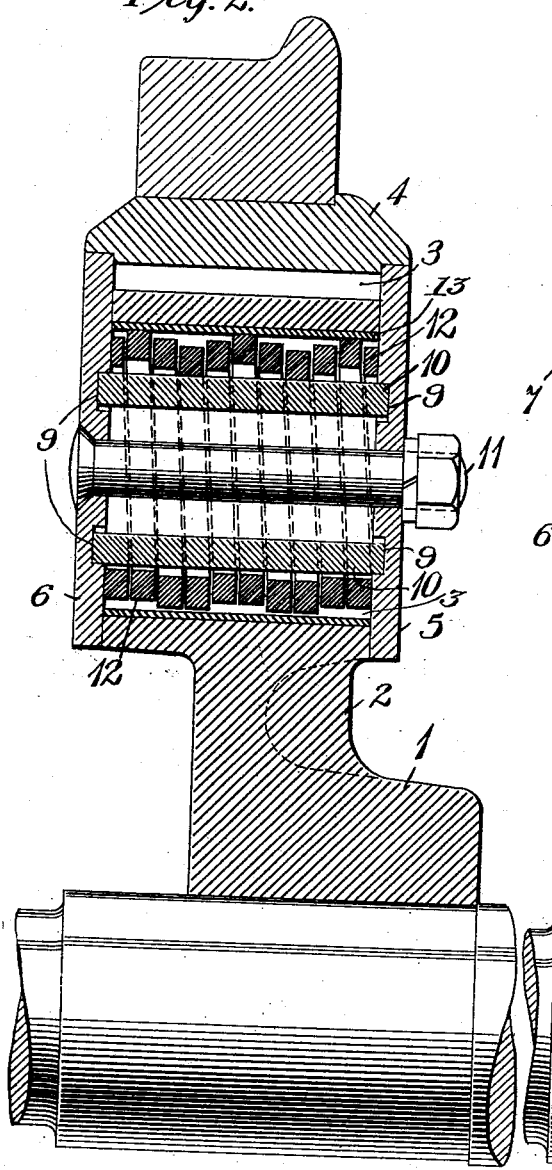
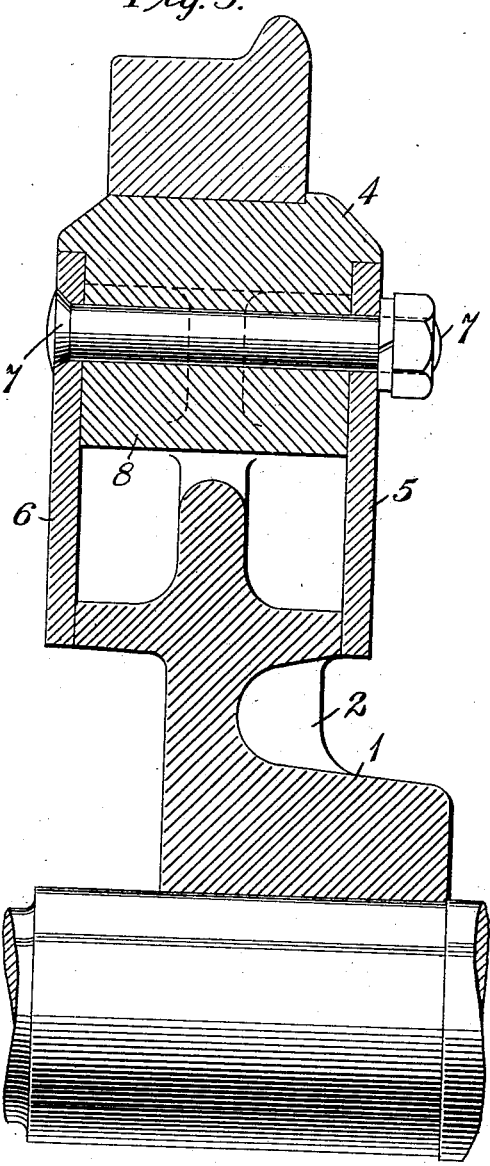
WITNESSES:
Fred H. Miller
R. F. Dearborn
INVENTOR
Karl F. Elers
BY
Wesley G. Carr
ATTORNEY

UNITED STATES PATENT OFFICE.

KARL F. ELERS, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

SPRING-WHEEL.

No. 917,856.      Specification of Letters Patent.      Patented April 13, 1909.

Application filed June 8, 1908. Serial No. 437,296.

*To all whom it may concern:*

Be it known that I, KARL F. ELERS, a citizen of the United States, and a resident of Pittsburg, in the county of Allegheny and State of Pennsylvania, have invented a new and useful Improvement in Spring-Wheels, of which the following is a specification.

My invention relates to vehicle or car wheels, and it has for its object to provide an improved resilient structure whereby the rim of the wheel may be yieldingly connected to the spider arms or spokes.

According to my present invention, I construct the spider and the rim of the wheel in two parts exclusive of the tire and interpose between them a plurality of helical springs which may be constructed in accordance with Patent No. 817,133, granted April 3, 1906, to the Westinghouse Electric & Manufacturing Company, as assignee of Robert Siegfried.

Figure 1 of the accompanying drawings is a partially sectional elevation of a portion of a car wheel constructed in accordance with my invention, and Figs. 2 and 3 are sectional views on lines II—II and III—III, respectively, of Fig. 1.

Referring to the drawings, the wheel comprises a spider or hub member 1 having a plurality of arms or spokes 2, the enlarged outer ends of which are joined together as an integral structure and are severally provided with cylindrical recesses or pockets 3, and a rim member 4 having annular plates 5 and 6 secured thereto by bolts 7. The rim member 4 is provided with a plurality of inwardly extending projections 8 which are disposed half way between the enlarged ends of the spokes or arms 2 of the spider and are provided with holes through which the bolts 7 extend. The inner faces of the plates 5 and 6 are provided with annular recesses 9 which are concentric with the cylindrical pockets and receive the ends of cylinders 10 the outside diameters of which are materially less than the inside diameters of the pockets. The cylinders 10 are clamped in position between the plates 5 and 6 by means of bolts 11, and helical springs 12, of the type set forth in the above-mentioned Patent No. 817,133, are interposed between the outer surfaces of the cylinders 10 and steel linings 13 of the pockets 3 to maintain a substantially concentric relation between the rim 4 and the spider.

By reason of the fact that the adjacent turns of the spring are eccentric, a yielding connection is established between the two members so that the vehicle truck and body, which are supported from the hubs of the wheels by the axles, are relieved of the shocks and strains which are always imposed upon the rims of the car wheels when they are operating at high speeds over rail joints and track irregularities.

In view of structural modifications which may be effected within the scope of my invention, I desire that only such limitations shall be imposed as are indicated in the appended claims.

I claim as my invention:

1. A wheel comprising a hub member having an annular set of cylindrical pockets, helical springs seated in said pockets and a rim member provided with annular plates to cover said pockets and with cylinders which are surrounded by said springs and are clamped between said annular plates.

2. In a wheel, the combination with a spider having a plurality of radial arms provided with recesses or pockets, of a rim having inwardly extending projections, annular guide plates secured to the projections, cylinders located in the pockets and secured to the guide plates, and means interposed between the cylinders and the pockets for providing a yielding connection between the spider and rim.

3. A vehicle wheel comprising a spider, the arms of which have end enlargements provided with pockets, and a rim having a plurality of inwardly extending projections disposed between the enlargements, annular plates secured to the projections, and resilient means interposed between the annular plates and the enlargements.

4. A vehicle wheel comprising a spider having a plurality of arms provided with cylindrical pockets, and a rim having annular plates secured thereto and covering the openings in the pockets, cylinders secured to the plates and projecting into the pockets, and resilient means interposed between the cylinders and the walls of the pockets for connecting the spider and the rim together.

5. A vehicle wheel comprising a spider the arms of which are provided with enlargements having cylindrical pockets, and a rim having a plurality of inwardly extending projections disposed between the enlargements of the spider arms, annular plates covering the openings in the pockets and secured to the rim projections, cylinders secured to the plates and extending through the pockets, and helical springs having eccentric adjacent turns surrounding the cylinders in the pockets.

6. A vehicle wheel comprising a hub member provided with an annular set of cylindrical pockets, helical springs seated in said pockets, and a rim member provided with annular plates which cover said pockets, cylinders surrounded by said springs, and bolts which clamp said cylinders between said annular plates.

7. The combination with a spider having a plurality of pockets arranged at equal distances from the center, of a rim having annular plates or rings extending over the openings in the pockets, cross members secured to the rings and extending into the pockets, and helical springs having eccentric adjacent turns encircling the cross members and forming a resilient connection between the spider and the rim.

In testimony whereof, I have hereunto subscribed my name this 29th day of May, 1908.

KARL F. ELERS.

Witnesses:
EDWIN TIDLAND,
BIRNEY HINES.